United States Patent
Masuda

(10) Patent No.: US 6,968,120 B1
(45) Date of Patent: Nov. 22, 2005

(54) INFORMATION RECORDING/REPRODUCING DEVICE AND INFORMATION RECORDING/REPRODUCING METHOD

(75) Inventor: Eiji Masuda, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 607 days.

(21) Appl. No.: 09/980,580

(22) PCT Filed: Jun. 2, 2000

(86) PCT No.: PCT/JP00/03628

§ 371 (c)(1),
(2), (4) Date: Mar. 1, 2002

(87) PCT Pub. No.: WO00/76211

PCT Pub. Date: Dec. 14, 2000

(30) Foreign Application Priority Data

Jun. 3, 1999 (JP) .................................. 11-155846

(51) Int. Cl.[7] ............................................ H04N 5/781
(52) U.S. Cl. ...................... 386/124; 386/46; 369/47.32
(58) Field of Search .................... 725/60, 65, 124, 725/125, 126, 127, 128, 129; 369/30.1, 47.32, 369/47.34

(56) References Cited

U.S. PATENT DOCUMENTS

| 4,724,495 A | * | 2/1988 | Hedberg et al. | ............. 386/124 |
| 4,768,104 A | * | 8/1988 | Kanamaru | .................. 386/124 |
| 6,512,883 B2 | * | 1/2003 | Shim et al. | .................. 386/126 |
| 6,842,578 B2 | * | 1/2005 | Nagasawa | .................. 386/126 |

FOREIGN PATENT DOCUMENTS

| JP | 7-254238 | 10/1995 |
| JP | 10-106169 | 4/1998 |
| JP | 11-7706 | 1/1999 |
| JP | 11-126410 | 5/1999 |

* cited by examiner

Primary Examiner—James J. Groody
Assistant Examiner—James A. Fletcher
(74) Attorney, Agent, or Firm—Wenderoth, Lind & Ponack, L.L.P.

(57) ABSTRACT

When recording or reproduction of data is to be performed, initially, recording or reproduction of data is performed from a position on a disk where data recording or reproduction becomes possible with a command being issued, followed by recording or reproduction of data corresponding to the subsequent positions. Thereafter, recording or reproduction of data corresponding to each position of a part on the disk where data recording or reproduction has not been performed is performed. Thereby, deterioration of recording/reproduction execution time due to a rotation wait which is caused by a command over-head or a retrial due to an error is reduced, whereby the recording/reproduction execution time can be reduced.

12 Claims, 9 Drawing Sheets

Fig.2

| recording or reproduction order | sector No. | data |
|---|---|---|
| 201 | sector 1 | 512Bytes |
| 202 | sector 2 | 512Bytes |
| 203 | sector 3 | 512Bytes |
| ... | ... | ... |
| 234 | sector 34 | 512Bytes |
| 235 | sector 35 | 512Bytes |
| ① | sector 36 | 512Bytes |
| 2 | sector 37 | 512Bytes |
| ... | ... | ... |
| 198 | sector 233 | 512Bytes |
| 199 | sector 234 | 512Bytes |
| 200 | sector 235 | 512Bytes |

※DV signal ; 1 frame=120KBytes (235 sectors)
　　　　　　1 sector=512Bytes

Fig.9(a) PRIOR ART
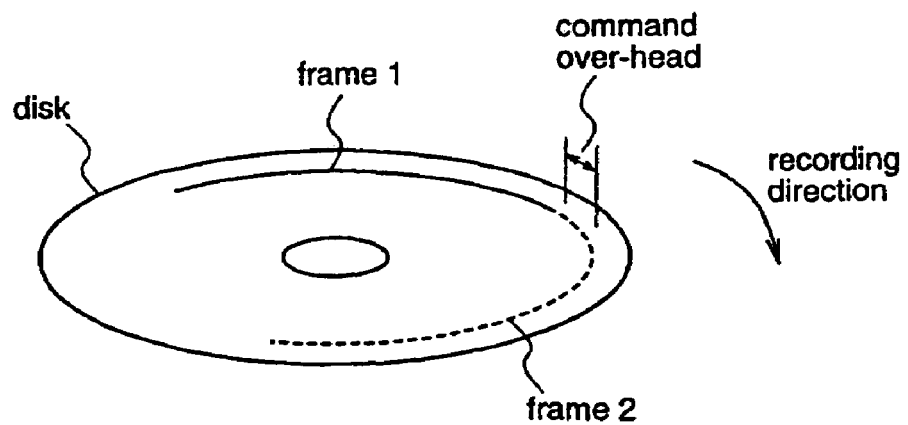
Fig.9(b) PRIOR ART
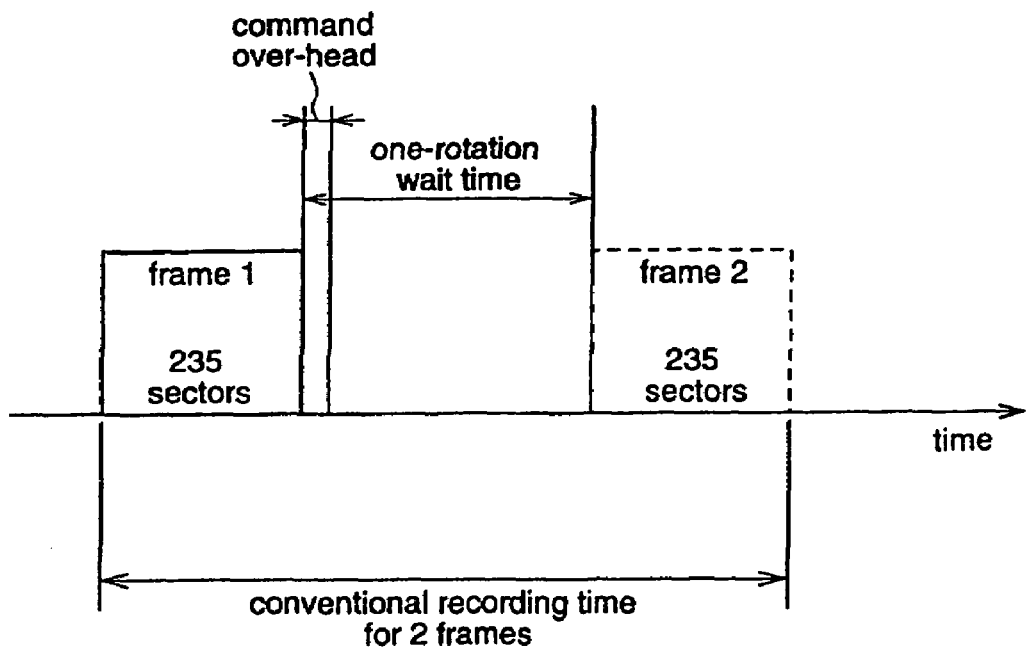

INFORMATION RECORDING/REPRODUCING DEVICE AND INFORMATION RECORDING/REPRODUCING METHOD

TECHNICAL FIELD

The present invention relates to an information recording/reproduction device and an information recording/reproduction method and, more particularly, to those for recording or reproducing information on a disk information carrier.

BACKGROUND ART

A disk drive which records or reproduces an image signal of a DV (Digital Video) format on/from a disk is now about to come under review. In the disk drive, when successive image data are recorded or reproduced, these data are recorded or reproduced on/from a disk surface while switching the head and the disk in the order of LBA (Logical Block Address) from the outer circumference of the disk toward the inner circumference or from the inner circumference toward the outer circumference.

At this time, a rotation wait due to a command over-head or a rotation wait for a retrial due to an error may occur during recording or reproduction, thereby taking time for recording or reproduction. In this case, when a serial DV signal is recorded or reproduced, if one frame of image cannot be recorded or reproduced within 33.34 ms which is the recording or reproduction time for one frame, this frame cannot be recorded or reproduced, resulting in a frame dropout.

FIG. 7 is a block diagram illustrating a conventional information recording/reproduction device.

In the conventional information recording/reproduction device, as shown in FIG. 7, when a DV signal from a DV device 7 inputted through a 1394 interface 1 is recorded on a disk 4, data to be recorded is modulated by a disk controller 2 and is recorded on the disk 4 by a recording/reproduction circuit 3.

FIG. 8 is a flowchart illustrating a conventional DV signal recording method, FIG. 9(a) is a diagram illustrating the state where a DV signal is recorded on a disk surface by the conventional DV signal recording method, and FIG. 9(b) is a diagram illustrating the execution time in the case where a rotation wait occurs due to over-head of a command when the DV signal is recorded on the disk surface by the conventional DV signal recording method.

As shown in FIG. 8, in the conventional DV signal recording method, initially, a recording sector unit NB is set to 235 as the number of sectors in one frame (Step S20), and a LBA(S) as a recording start LBA is set (Step S21). Next, the number of frames Frame(R) to be recorded is set (Step S22), and then recording is started (Step S23). However, a one-rotation wait occurs due to over-head of a command (Step S24), and recording is started from a recording start sector position after the one-rotation wait (Step S25). This operation is repeated to reach the set number of recording frames (Steps S26 to S27).

As described above, in the conventional device and method for information recording or reproduction, when a serial DV signal is recorded or reproduced, a one-rotation wait always occurs due to over-head of a command, thereby taking an additional recording/reproduction execution time for one rotation every time a command is issued. Further, the recording/reproduction execution time becomes longer when a retrial due to an error is carried out. When the recording/reproduction execution time becomes longer and one frame of image cannot be recorded or reproduced within 33.34 ms which is the recording/reproduction time for one frame, this frame is not recorded or reproduced, resulting in a frame dropout.

The present invention is made to solve the above-mentioned problems and has for its object to provide an information recording/reproduction device and an information recording/reproduction method, which can reduce deterioration (prolongation) of recording/reproduction execution time by removing a rotation wait caused by over-head of a command or retrial due to an error, thereby avoiding the situations that a frame is not recorded or reproduced at recording or reproduction and that a frame dropout occurs.

SUMMARY DISCLOSURE OF THE INVENTION

According to the present invention, an information recording/reproduction device comprises an interface for exchanging data with an external device, a disk controller for modulating/demodulating data to record or reproduce the data onto a disk as an information recording medium, a memory for temporarily storing data to be recorded on the disk or data reproduced from the disk, a recording/reproduction circuit for recording data on the disk or reproducing data from the disk, and a CPU for controlling the disk controller; wherein, when recording or reproduction of data is to be performed, initially, recording or reproduction of data is performed from a position on the disk where data recording or reproduction becomes possible with a command being issued, followed by recording or reproduction of data corresponding to the subsequent positions, and thereafter, recording or reproduction of data corresponding to each position of a part on the disk where data recording or reproduction has not been performed, is performed. Therefore, deterioration of recording/reproduction execution time due to a rotation wait which is caused by a command over-head or a retrial due to an error can be reduced, whereby the recording/reproduction execution time can be reduced.

According to the present invention, in the above-described information recording/reproduction device, the data is a DV (Digital Video) signal. Therefore, deterioration of recording/reproduction execution time due to a rotation wait which is caused by a command over-head or a retrial due to an error, occurring when recording or reproducing a DV signal, can be reduced, whereby the recording/reproduction execution time can be reduced.

According to the present invention, in the above-described information recording/reproduction device, when recording or reproduction of a DV signal is to be performed, initially, the DV signal is treated in units of frames, and recording or reproduction of a DV signal is performed from a LBA on the disk where recording or reproduction of the DV signal becomes possible with a command being issued, followed by recording or reproduction of DV signals corresponding to the subsequent LBAs, and thereafter, recording or reproduction of a DV signal corresponding to each LBA of a part on the disk where DV signal recording or reproduction has not been performed, is performed. Therefore, deterioration of recording/reproduction execution time due to a rotation wait which is caused by a command over-head or a retrial due to an error, can be reduced more efficiently, and frame dropouts can also be prevented more efficiently, as compared with the case where the DV signal is treated in units of sectors.

According to the present invention, in an information recording/reproduction method for recording or reproducing data on/from a disk as an information recording medium, initially, recording or reproduction of data is performed from a LBA on the disk where recording or reproduction of data becomes possible with a command being issued and tracking being completed, followed by recording or reproduction of data corresponding to the subsequent LBAs, and thereafter, recording or reproduction of data corresponding to each LBA of a part on the disk where data recording or reproduction has not been performed, is performed. Thereby, deterioration of recording/reproduction execution time due to a rotation wait which is caused by a command over-head or a retrial due to an error, can be reduced, whereby the recording/reproduction execution time can be reduced.

According to the present invention, in an information recording/reproduction method for recording or reproducing data on/from a disk as an information recording medium, a LBA from which recording or reproduction of data is to be started is previously decided to be a value larger than a LBA at which recording or reproduction of data becomes possible with a command being issued, and recording or reproduction of data is performed from a LBA on the disk from which recording or reproduction of data is to be started with a command being issued, followed by recording or reproduction of data corresponding to the subsequent LBAs, and thereafter, recording or reproduction of data corresponding to each LBA of a part on the disk where data recording or reproduction has not been performed, is performed. Therefore, a device and a method for detecting a LBA at which recording or reproduction becomes possible with a command being issued and tracking being completed, are dispensed with, and thus, deterioration of recording/reproduction execution time due to a rotation wait which is caused by a command over-head or a retrial due to an error, can be reduced by a simpler construction, whereby the recording/reproduction execution time can be reduced.

According to the present invention, in the above-described information recording/reproduction method, the LBA from which recording or reproduction of data is started is previously decided separately for data recording and data reproduction. Therefore, the recording/reproduction execution time can be set respectively for recording and reproduction, and thus, deterioration of recording/reproduction execution time due to a rotation wait which is caused by a command over-head or a retrial due to an error, can be reduced respectively for recording and reproduction, whereby the overall (total) recording/reproduction execution time can be reduced.

According to the present invention, in the above-described information recording/reproduction method, the data is a DV signal. Therefore, deterioration of recording/reproduction execution time due to a rotation wait which is caused by a command over-head or a retrial due to an error, occurring when recording or reproducing a DV signal, can be reduced, whereby the recording/reproduction execution time can be reduced.

According to the present invention, in the above-described information recording/reproduction method, the DV signal is treated in units of frames. Therefore, deterioration of recording/reproduction execution time due to a rotation wait which is caused by a command over-head or a retrial due to an error can be reduced more efficiently, and frame dropouts can also be prevented more efficiently, as compared with the case where the DV signal is treated in units of sectors.

BRIEF DESCRIPTION OF DRAWINGS

FIG. 2 is a diagram illustrating the constitution of a frame memory of the information recording/reproduction device according to the first embodiment of the invention.

DETAILED DESCRIPTION OF THE INVENTION

Figure 1:
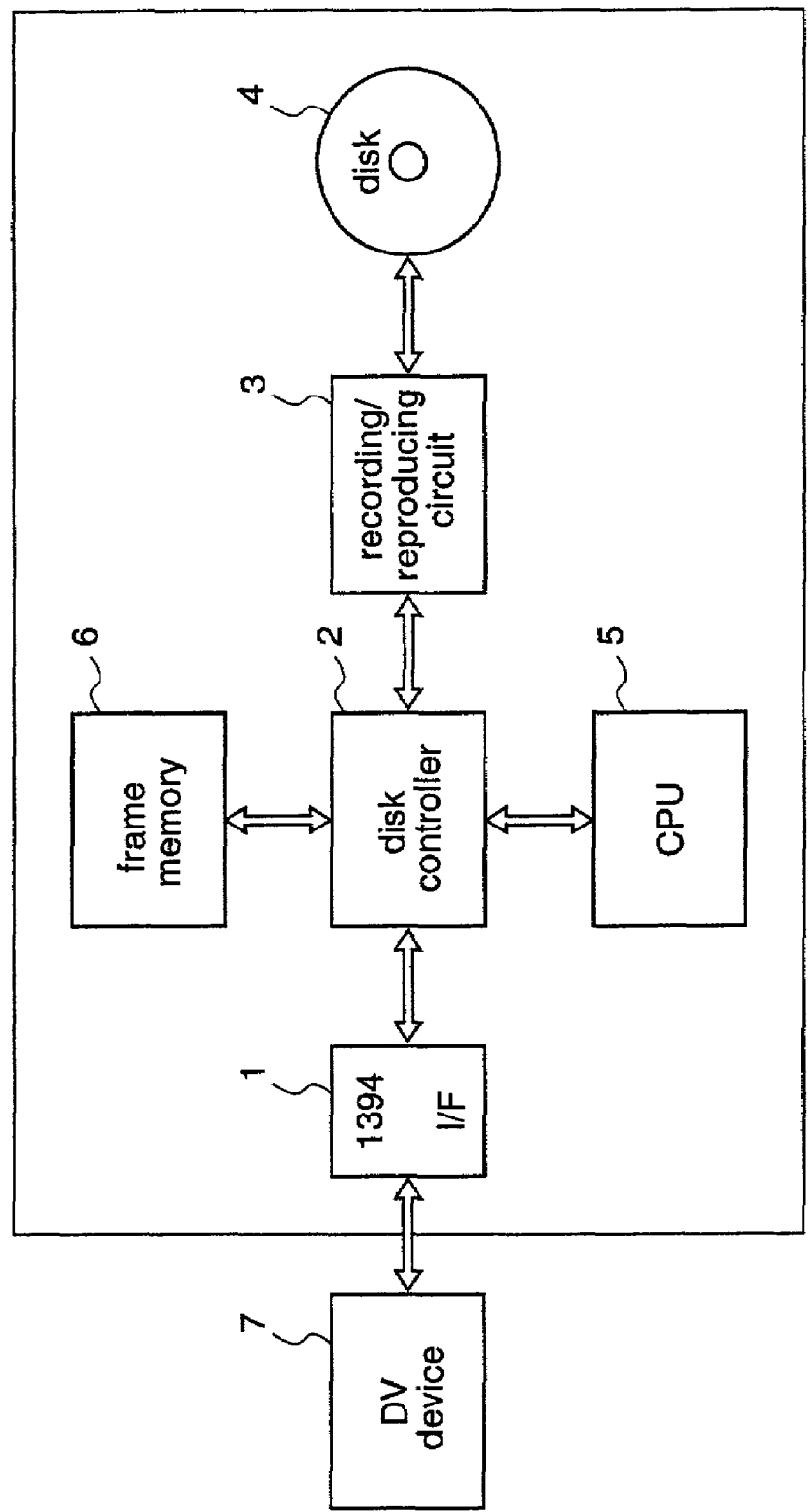
FIG. 1 is a block diagram illustrating an information recording/reproduction device according to a first embodiment of the present invention.

Hereinafter, a preferred device and method for information recording or reproduction according to the present invention will be described in detail with reference to the figures. In the figures, constituents having the same function will be denoted by the same reference numerals.

Embodiment 1

FIG. 1 is a block diagram illustrating an information recording/reproduction device according to a first embodiment of the present invention, and FIG. 2 is a diagram illustrating the constitution of a frame memory included in the information recording/reproduction device according to the first embodiment of the invention.

As shown in FIG. 1, this information recording/reproduction device includes a 1394 interface 1 which receives a serial signal from a DV device 7; a disk controller 2 which converts the serial signal into a parallel signal and temporarily stores the parallel signal in a frame memory 6 so as to control the signal flow or modulate/demodulate the DV signal for recording or reproducing it onto a disk 4 as an information recording medium; a recording/reproduction circuit 3 which records or reproduces the DV signal on/from the disk 4; and a CPU 5 which controls the disk controller 2. When the DV signal from the DV device 7 inputted through the 1394 interface 1 is recorded on the disk 4, the serial DV signal is once converted into the parallel signal by the disk controller 2, and thereafter, recording data for one frame (235 sectors) are stored in the frame memory 6 in a format as shown in FIG. 2 where sector numbers are assigned to the respective sectors. The stored recording data are modulated by the disk controller 2 and then recorded on the disk 4 by the recording/reproduction circuit 3.

Figure 3:
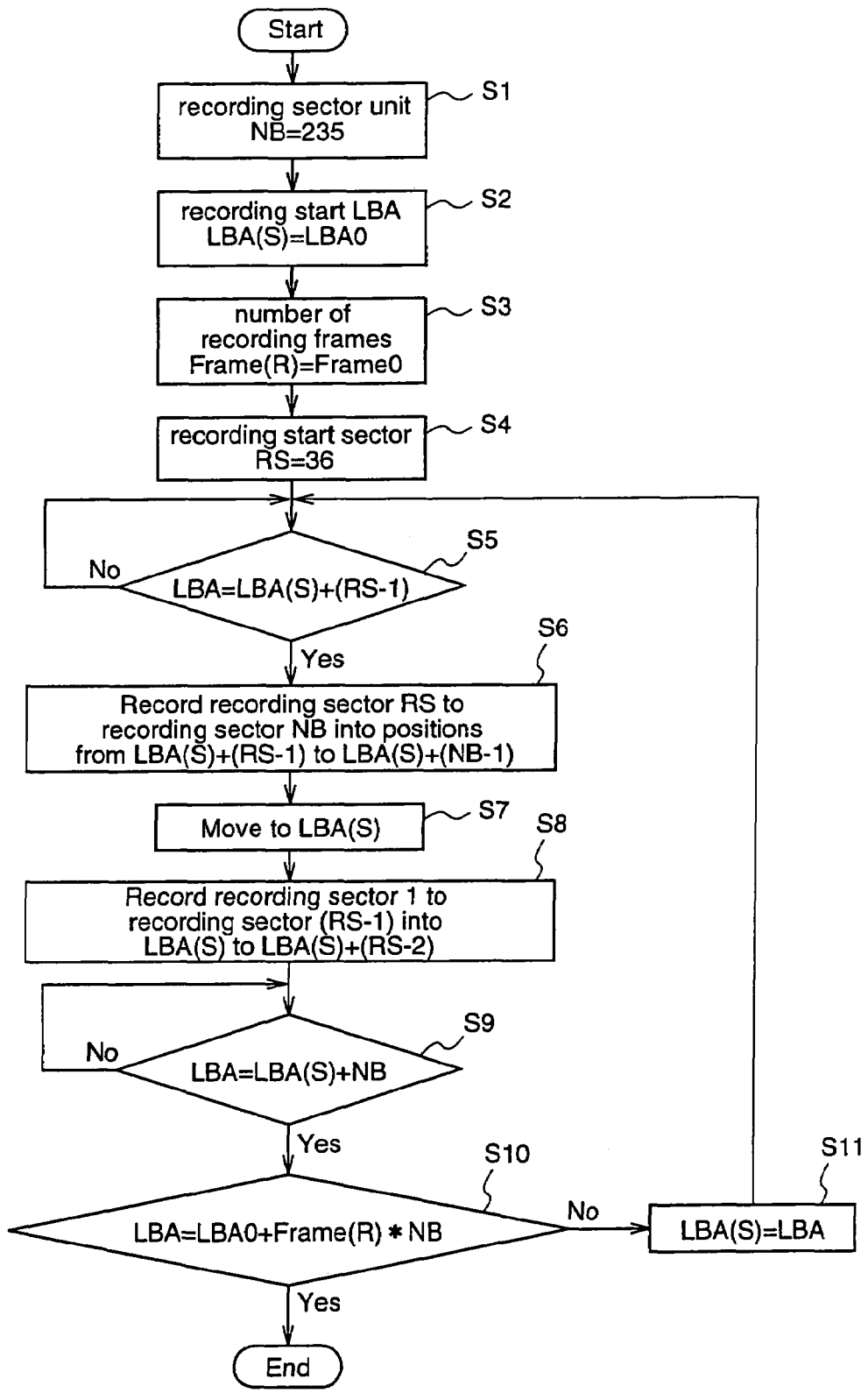
FIG. 3 is a flowchart illustrating a DV signal recording method according to the first embodiment of the invention.
Figure 6A:
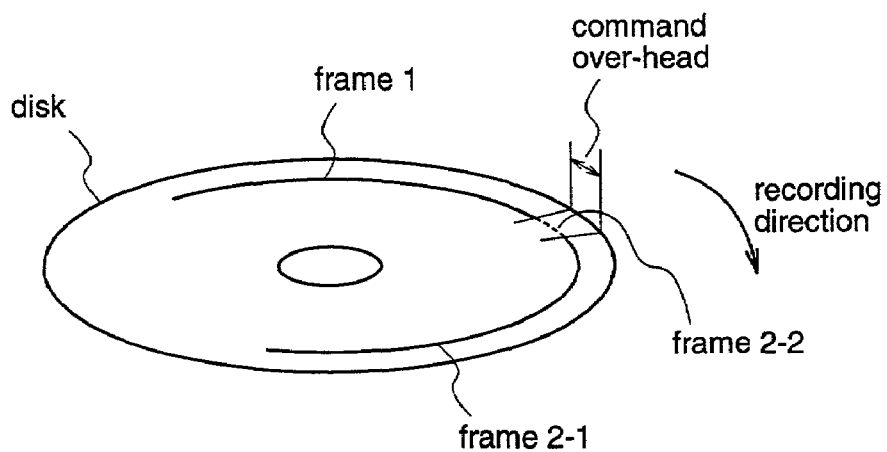
Figure 6B:
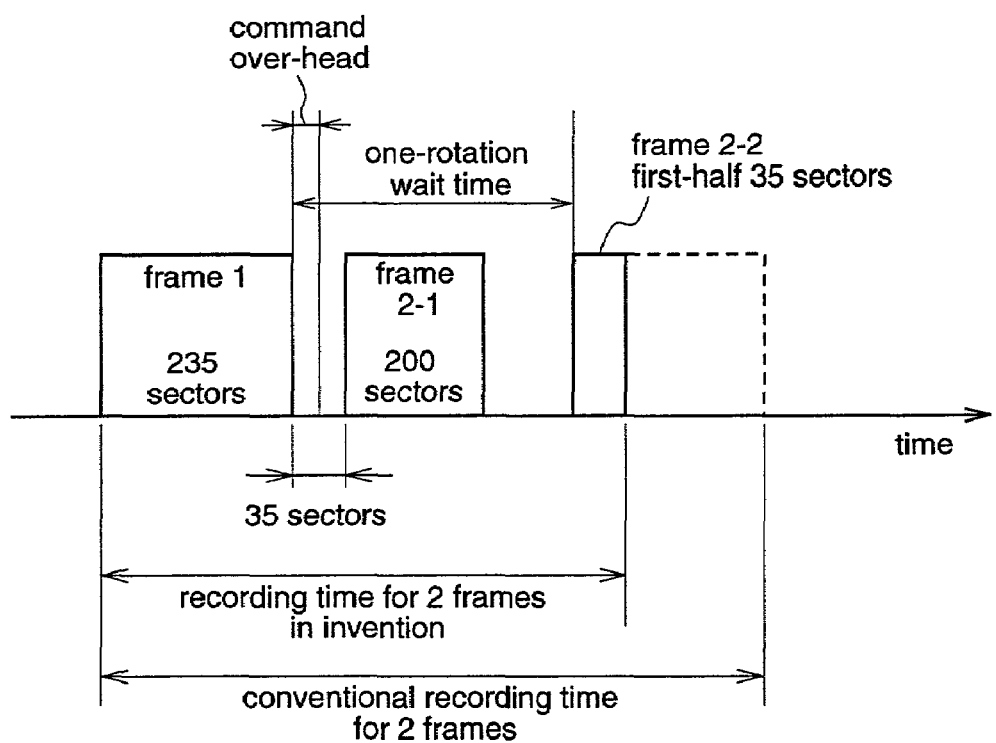
Figure 7:
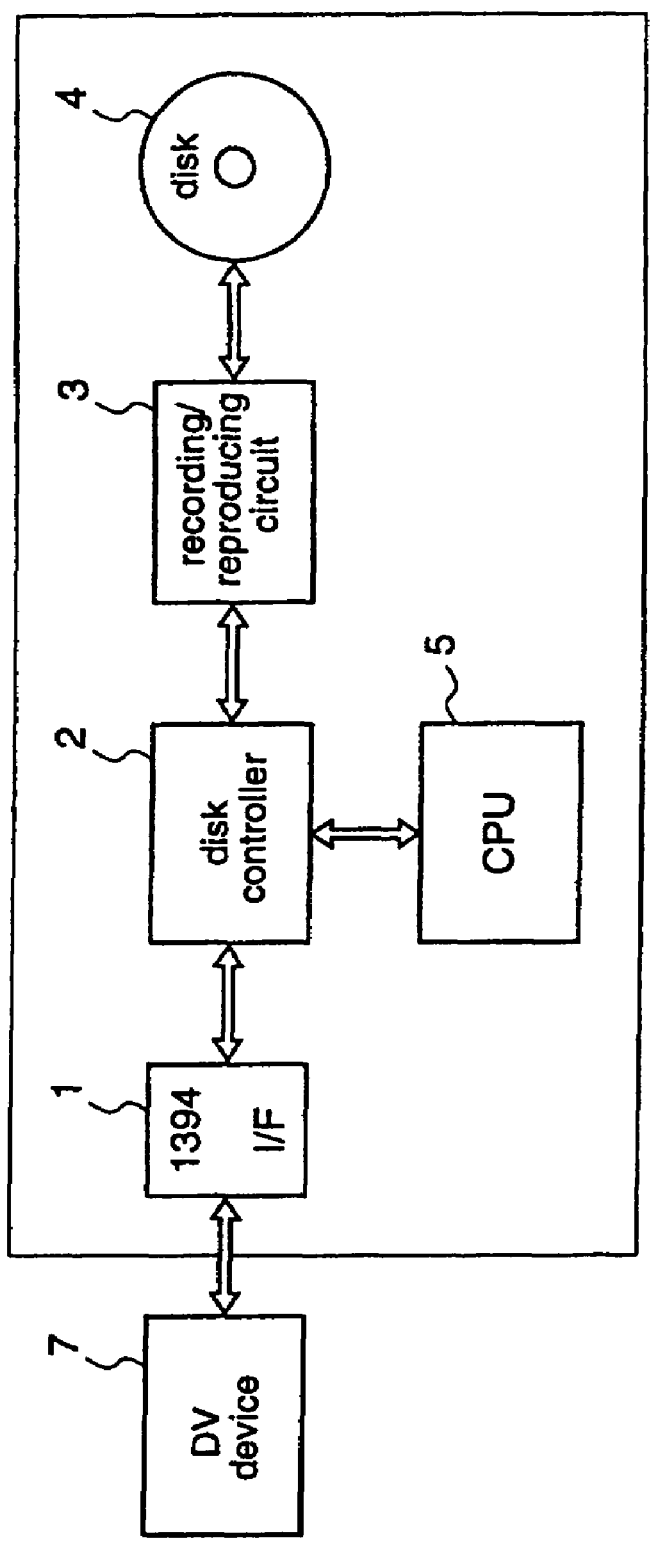
FIG. 7 is a block diagram illustrating a conventional information recording/reproduction device.
Figure 8:
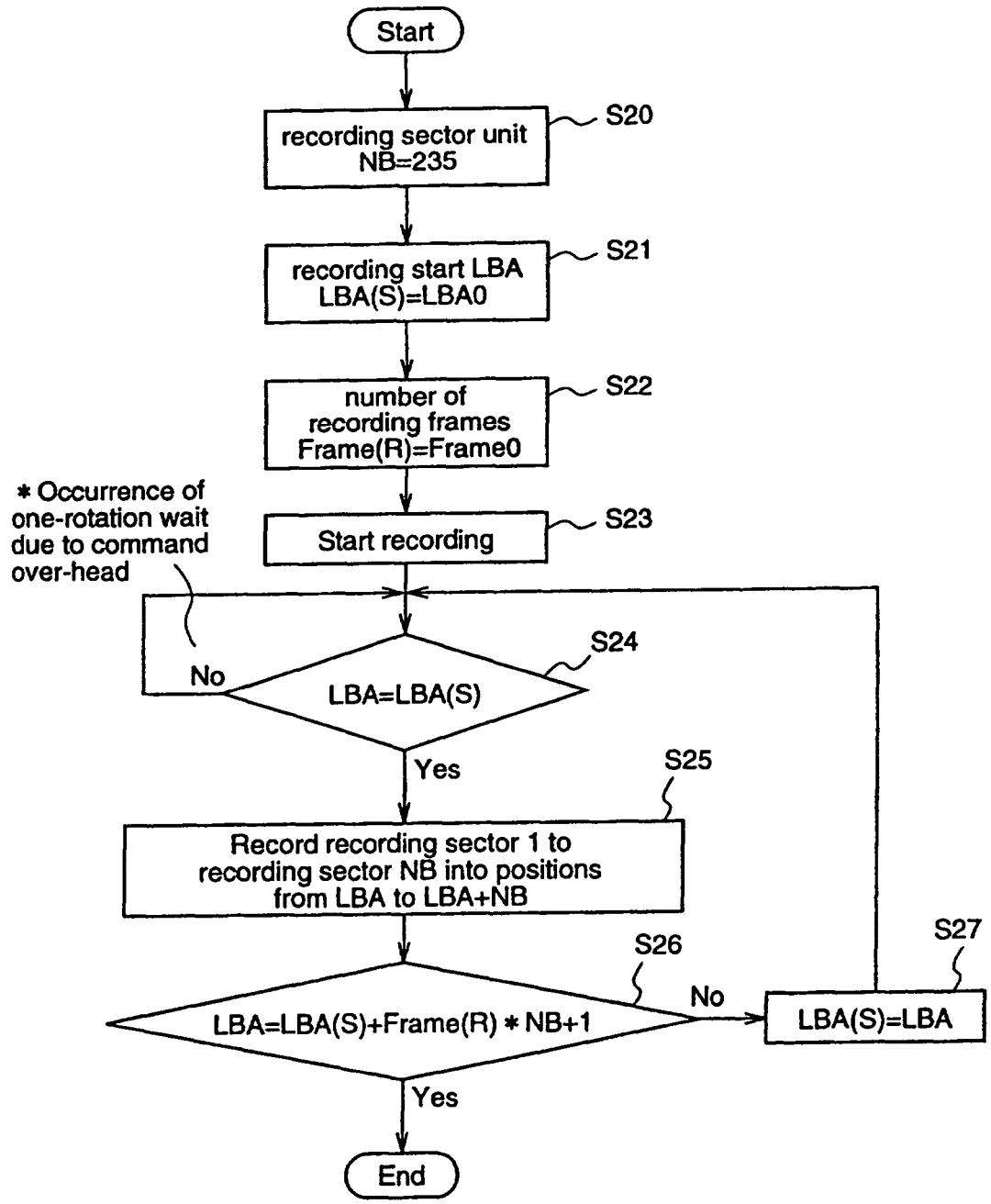
FIG. 8 is a flowchart illustrating a conventional DV signal recording method, FIG. 9(*a*) is a diagram illustrating the state where a DV signal is recorded on a disk surface by the conventional DV signal recording method, and FIG. 9(*b*) is a diagram illustrating the execution time in the case where a rotation wait occurs due to a command over-head, when the DV signal is recorded on the disk surface by the conventional DV signal recording method.

FIG. 3 is a flowchart illustrating a DV signal recording method according to the first embodiment of the invention, FIG. 6(a) is a diagram illustrating the state where a DV signal is recorded on a disk surface by the DV signal recording method according to the first embodiment of the invention, and FIG. 6(b) is a diagram illustrating the execution time when the DV signal is recorded on the disk surface by the DV signal recording method according to the first embodiment of the invention.

As shown in FIG. 3, in the DV signal recording method according to the first embodiment, initially, a recording sector unit NB is set to 235 as the number of sectors in one frame (Step S1), and a LBA(S) as a recording start LBA is set (Step S2). After the number of recording frames Frame (R) is set (Step S3), a recording start sector in a recording frame (235 sectors) is previously decided at a sector position RS where recording can be started (Step S4), and recording is started from the recording start sector position (Steps S5 to S6), and thereafter, sectors prior to the recording start sector, which have not been recorded, are recorded (Steps S7 to S8). This operation is repeated to reach the set number of recording frames (Steps S9 to S11).

As described above, the device and method for information recording or reproduction according to the first embodiment of the invention can reduce the execution time (refer to FIG. 6(b)) when the DV signal is recorded on the disk surface, as compared with the execution time in the case where a rotation wait occurs when the DV signal is recorded on the disk surface by the conventional DV signal recording method.

Embodiment 2

An information recording/reproduction device according to a second embodiment of the present invention has the same construction as the information recording/reproduction device according to the first embodiment shown in FIGS. 1 and 2.

Figure 4:
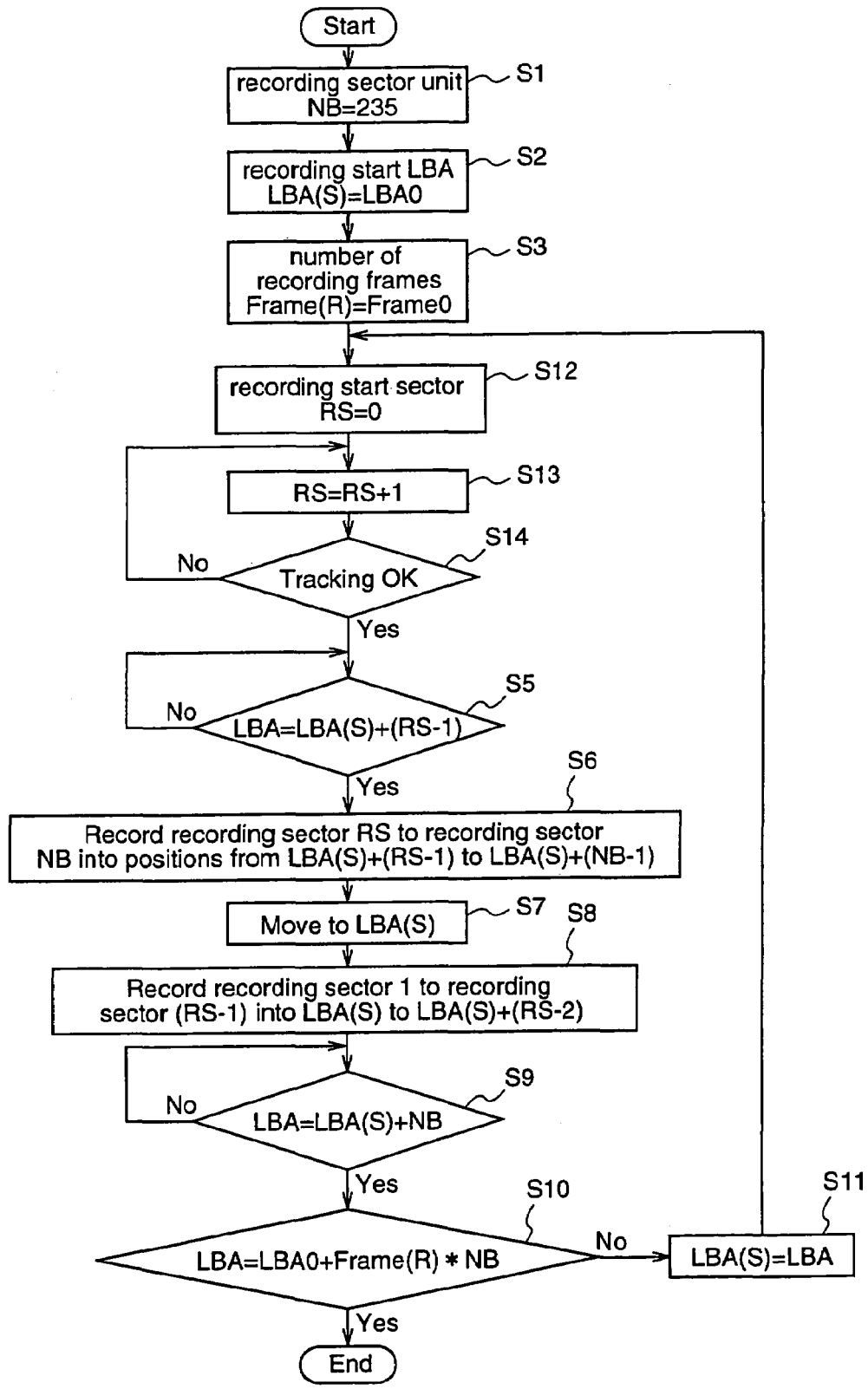
FIG. 4 is a flowchart illustrating a DV signal recording method according to a second embodiment of the present invention.

FIG. 4 is a flowchart illustrating a DV signal recording method according to the second embodiment of the invention.

As shown in FIG. 4, in the DV signal recording method according to the second embodiment, initially, a recording sector unit NB is set to 235 as the number of sectors in one frame (Step S1), and a LBA(S) as a recording start LBA is set (Step S2). After the number of recording frames Frame (R) is set (Step S3), a sector position RS of a recording start sector in a recording frame (235 sectors) is set to 0 (Step S12), the sector position RS is incremented (Step S13), and it is judged whether tracking is completed or not (Step S14). When tracking has been completed, recording is performed from the recording start position (Steps S5 to S6), and thereafter, sectors prior to the recording start sector, which have not been recorded, are recorded (Steps S7 to S8). This operation is repeated to reach the set number of recording frames (Steps S9 to S11).

As described above, the device and method for information recording or reproduction according to the second embodiment start recording from the point where tracking is completed, whereby deterioration of recording/reproduction execution time due to a rotation wait which is caused by a command over-head or a retrial due to an error can be reduced, resulting in reduced recording/reproduction execution time.

Embodiment 3

An information recording/reproduction device according to a third embodiment of the present invention has the same construction as the information recording/reproduction device according to the first embodiment shown in FIGS. 1 and 2.

Figure 5:
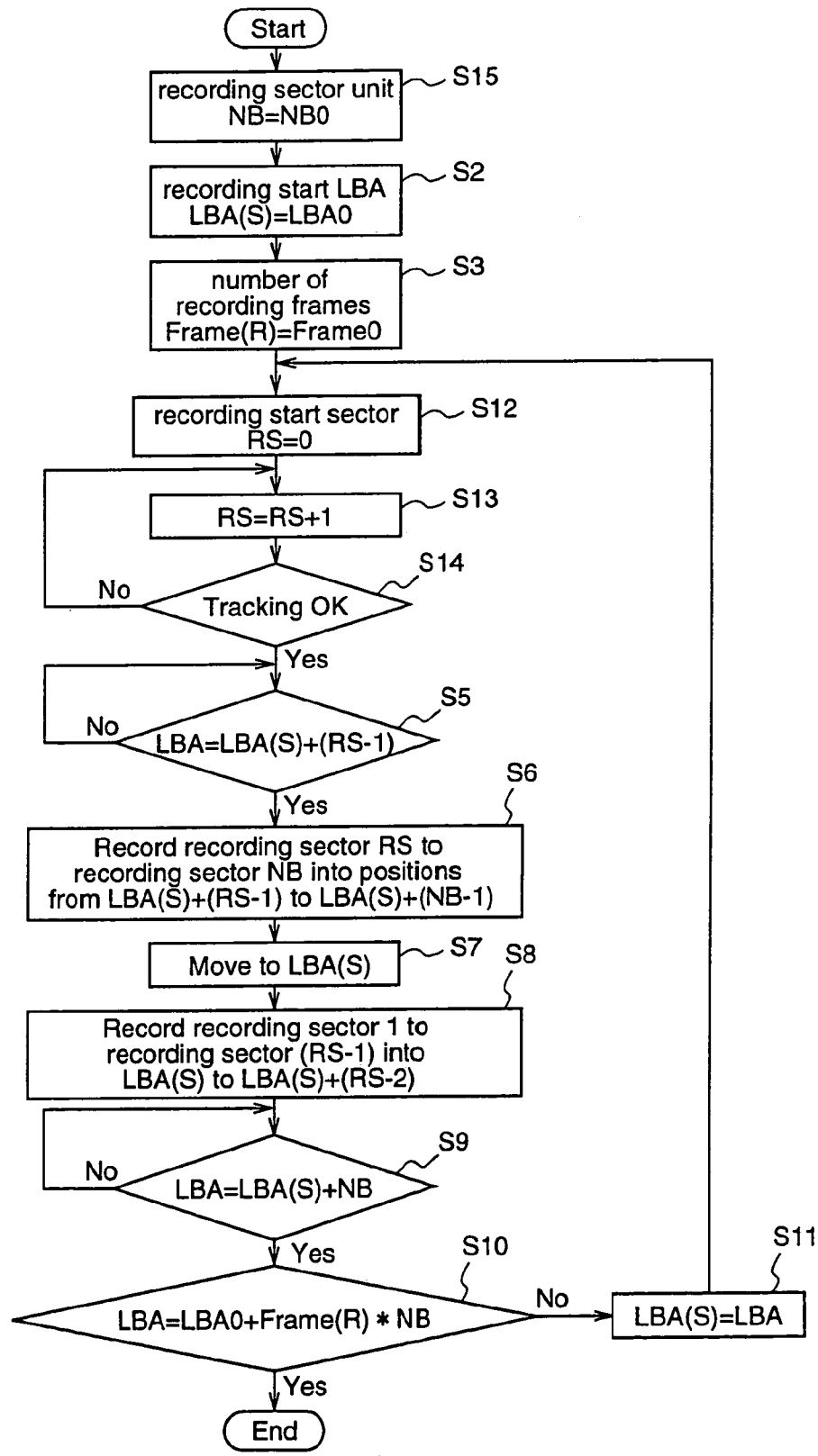
FIG. 5 is a flowchart illustrating an information recording method according to a third embodiment of the present invention, FIG. 6(*a*) is a diagram illustrating the state where a DV signal is recorded on a disk surface by the DV signal recording method according to the first embodiment of the invention, FIG. 6(*b*) is a diagram illustrating the execution time when the DV signal is recorded on the disk surface by the DV signal recording method according to the first embodiment of the invention.

FIG. 5 is a flowchart illustrating a DV signal recording method according to the third embodiment of the invention.

As shown in FIG. 5, in the DV signal recording method according to the third embodiment, initially, a recording sector unit NB is set to NB0 (Step S15), and a LBA(S) as a recording start LBA is set (Step S2). After the number of recording frames Frame(R) is set (Step S3), a sector position RS of a recording start sector in a recording frame (235 sectors) is set to 0 (Step S12), the sector position RS is incremented (Step S13), and it is judged whether tracking is completed or not (Step S14). When tracking has been completed, recording is performed from the recording start position (Steps S5 to S6), and thereafter, sectors prior to the recording start sector, which have not been recorded, are recorded (Steps S7 to S8). This operation is repeated to reach the set number of recording frames (Steps S9 to S11).

As described above, the device and method for information recording or reproduction according to the third embodiment can reduce deterioration of the recording execution time due to a rotation wait which is caused by a command over-head or a retrial due to an error, whereby the recording execution time can be reduced even when a signal to be recorded on the disk is different from a DV signal and the number of sectors is different from that of the DV signal.

While the case of performing recording is described for the devices and methods of information recording and reproduction according to the first to third embodiments, dropout of a frame to be reproduced, which results from a rotation wait caused by a command over-head or a retrial due to an error, can also be prevented in the case of performing reproduction, and the overall (total) recording/reproduction execution time of the information recording/reproduction device can be reduced by employing the recording/reproduction method of the present invention for both of recording and reproduction.

APPLICABILITY IN INDUSTRY

As described above, an information recording/reproduction device and an information recording/reproduction method according to the present invention are available as a disk drive which records or reproduces an image signal of a DV (Digital Video) format on a disk.

What is claimed is:

1. An information recording/reproduction device for successively recording or reproducing continuous data, the information recording/reproduction device comprising:
   an interface operable to exchange data with an external device;
   a disk controller operable to modulate or demodulate data to be record on or reproduced from, respectively, a disk;
   a memory for temporarily storing the data to be recorded on or reproduced from the disk;
   a recording/reproduction circuit operable to record the data on the disk or reproduce the data from the disk; and a CPU for controlling the disk controller, wherein when the recording/reproduction circuit is to record or reproduce a predetermined sector number of second data based on an issuance of a recording command or a reproduction command, respectively, immediately after a predetermined sector number of first data is recorded or reproduced:

successively from a position on the disk where recording or reproduction of the second data has become possible with the issuance of the recording command or the reproduction command, the recording/reproduction circuit records the second data from the predetermined sector number in respectively corresponding recording positions on the disk or reproduces the second data from the predetermined sector number which are recorded in the respectively corresponding recording positions on the disk, respectively, and after the recording or reproduction of the second data from the predetermined sector number, with respect to a portion of the second data prior to the predetermined sector number which has not been recorded or reproduced, the recording/reproduction circuit records the portion of the second data in respectively corresponding recording positions on the disk or reproduces the portion of the second data which are recorded in the respectively corresponding recording positions on the disk, respectively, at a next rotation of the disk.

2. The information recording/reproduction device as defined in claim 1, wherein the second data is a DV (Digital Video) signal.

3. The information recording/reproduction device as defined in claim 2, wherein the recording/reproduction circuit records or reproduces the DV signal in units of frames, and the position and the respectively corresponding recording positions on the disk are logical block addresses on the disk.

4. An information recording/reproduction method for successively recording or reproducing data on/from a disk, the information recording/reproduction method comprising:

when recording or reproducing of a predetermined sector number of second data is to be performed based on an issuance of a recording command or a reproduction command, respectively, issued after detecting a completion of tracking and immediately after a predetermined sector number of first data is recorded or reproduced:

successively from a logical block address on the disk where recording or reproduction of the second data has become possible, recording the second data from the predetermined sector number in respectively corresponding logical block addresses on the disk or reproducing the second data from the predetermined sector number which are recorded in the respectively corresponding logical block addresses on the disk, respectively; and after the recording or reproducing of the second data from the predetermined sector number, with respect to a portion of the second data prior to the predetermined sector number which has not been recorded or reproduced, recording the portion of the second data in respectively corresponding logical block addresses on the disk or reproducing the portion of the second data which are recorded in the respectively corresponding logical block addresses on the disk, respectively, at a next rotation of the disk.

5. An information recording/reproduction method for successively recording or reproducing continuous data on/from a disk, the information recording/reproduction method comprising:

when recording or reproducing of a predetermined sector number of second data is to be performed based on an issuance of a recording command or a reproduction command, respectively, issued immediately after a predetermined sector number of first data is recorded or reproduced, a logical block address from which recording or reproduction of the second data is to be started being predetermined as being higher than a logical block address at which recording or reproduction has become possible after the issuance of the recording command or the reproduction command:

successively from the logical block address on the disk where recording or reproduction of the second data is to be started, recording the second data from the predetermined sector number in respectively corresponding logical block addresses on the disk or reproducing the second data from the predetermined sector number which are recorded in the respectively corresponding logical block addresses on the disk, respectively; and after the recording or reproducing of the second data from the predetermined sector number, with respect to a portion of the second data prior to the predetermined sector number which has not been recorded or reproduced, recording the portion of the second data in respectively corresponding logical block addresses on the disk or reproducing the portion of the second data which are recorded in the respectively corresponding logical block addresses on the disk, respectively, at a next rotation of the disk.

6. The information recording/reproduction method as defined in claim 5, wherein the logical block address from which recording or reproduction of data is to be started is a first logical block address for data recording and a second, different logical block address for data reproduction.

7. The information recording/reproduction method as defined in claims 4, wherein the second data is a DV signal.

8. The information recording/reproduction method as defined in claim 7, wherein the recording or reproducing of the DV signal comprises recording or reproducing the DV signal in units of frames.

9. The information recording/reproduction method as defined in claim 5, wherein the second data is a DV signal.

10. The information recording/reproduction method as defined in claim 6, wherein the second data is a DV signal.

11. The information recording/reproduction method as defined in claim 9, wherein the recording or reproducing of the DV signal comprises recording or reproducing the DV signal in units of frames.

12. The information recording/reproduction method as defined in claim 10, wherein the recording or reproducing of the DV signal comprises recording or reproducing the DV signal in units of frames.

* * * * *